United States Patent
Sauer et al.

(10) Patent No.: US 9,121,422 B2
(45) Date of Patent: Sep. 1, 2015

(54) SYSTEM BOARD FASTENER

(75) Inventors: Keith A Sauer, Spring, TX (US); David M Paquin, Cypress, TX (US); Kelly K Smith, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 13/484,609

(22) Filed: May 31, 2012

(65) Prior Publication Data

US 2013/0322983 A1    Dec. 5, 2013

(51) Int. Cl.
*H05K 5/00* (2006.01)
*F16B 5/02* (2006.01)
*F16B 33/00* (2006.01)

(52) U.S. Cl.
CPC .............. *F16B 5/02* (2013.01); *F16B 33/002* (2013.01); *Y10T 29/49947* (2015.01)

(58) Field of Classification Search
USPC ......... 361/759, 807, 809, 810, 728–730, 752, 361/796, 800; 174/138 E, 138 G; 312/223.1, 312/223.2
See application file for complete search history.

(56) References Cited

U.S. PATENT DOCUMENTS

| | | | |
|---|---|---|---|
| 4,252,288 A * | 2/1981 | Behrendt | 248/27.1 |
| 4,429,204 A * | 1/1984 | McGuire et al. | 219/751 |
| 4,790,574 A * | 12/1988 | Wagner et al. | 285/419 |
| 5,244,193 A * | 9/1993 | Hehr | 269/99 |
| 6,522,556 B2 | 2/2003 | Boe | |
| 6,709,212 B1 | 3/2004 | Lauchner | |
| 6,856,514 B2 | 2/2005 | Smith | |
| 6,930,886 B2 | 8/2005 | Velez et al. | |
| 7,034,223 B2 * | 4/2006 | Fan et al. | 174/51 |
| 7,656,657 B2 | 2/2010 | Grady et al. | |
| 7,708,510 B2 * | 5/2010 | Reimler | 411/166 |
| 7,983,057 B2 | 7/2011 | Zheng et al. | |
| 2007/0279858 A1 | 12/2007 | Grady et al. | |
| 2010/0296241 A1 | 11/2010 | Yeh et al. | |
| 2012/0304457 A1 * | 12/2012 | Chiu et al. | 29/729 |

* cited by examiner

*Primary Examiner* — Hung S Bui
(74) *Attorney, Agent, or Firm* — Hewlett-Packard Patent Department

(57) ABSTRACT

A fastener useable with a system board is provided herein. The fastener includes a fastener body and a spool. The fastener body has a mating member at one end and a threaded member at an opposite end. The mating member extends from the fastener body and positions the fastener body on a chassis. The spool engages with the threaded member of the fastener body and is secured to the chassis.

19 Claims, 7 Drawing Sheets

SYSTEM BOARD FASTENER

BACKGROUND

A server rack supports multiple servers. Server chassis on the server rack are used to support the system boards on the server rack. The system board is attached to the server chassis.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

A system board is attached to a sub-pan. The system board with the sub-pan attached is then attached to a chassis. The chassis is typically designed to receive a specific system board. For example, the chassis is designed with apertures at predetermined positions to attach one type of system board thereto. The attachment of the system board to the chassis typically includes fasteners, such as a dozen screws with standoffs, which are attachable to the chassis only at the predetermined positions corresponding to the apertures in the system board and tightened using tools.

In examples, a fastener useable with a system board is provided. The fastener includes a fastener body and a spool. The fastener body has a mating member at one end and a threaded member at an opposite end. The mating member extends from the fastener body and positions the fastener body on a chassis. The spool engages with the threaded member of the fastener body to secure the fastener onto the chassis.

Figure 1:
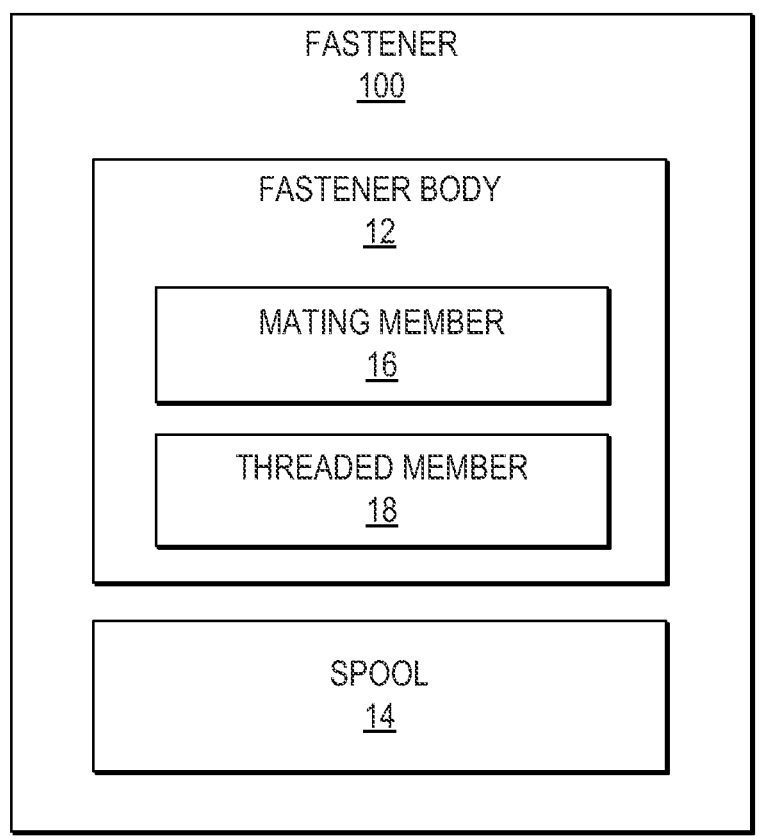
FIG. 1 illustrates a block diagram of a fastener usable with a system board according to an example.

FIG. 1 illustrates a block diagram of a fastener 100 useable with a system board according to an example. The fastener 100 includes a fastener body 12 and a spool 14. The fastener body 12 has a mating member 16 at one end and a threaded member 18 at an opposite end. The mating member 16 extends from the fastener body 12 and positions the fastener body 12 on a chassis.

The fastener body 12 passes through a chassis aperture, such that the threaded member 18 extends therethrough. The spool 14 engages with the threaded member 18 of the fastener body 12. The spool 14 and the fastener body 12 are secured to the chassis to receive a sub-pan with the system board attached.

Figure 2:
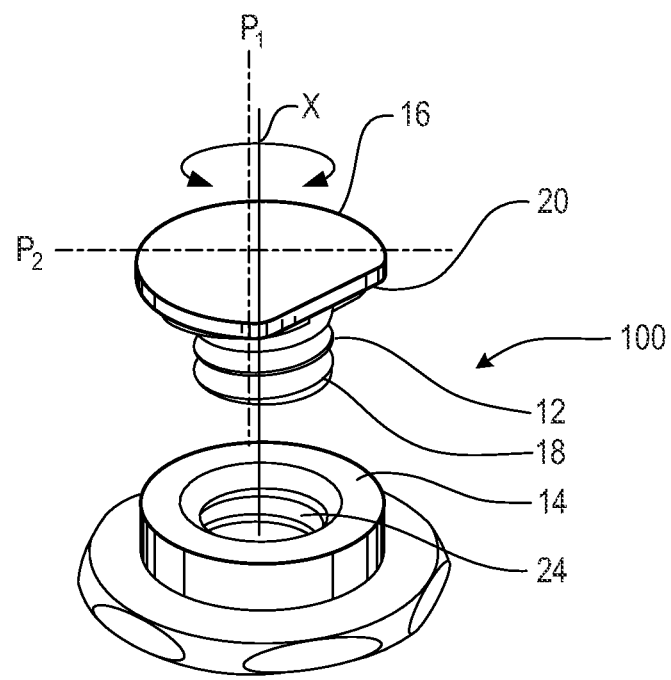
FIG. 2 illustrates the fastener of FIG. 1 according to an example.

FIG. 2 illustrates the fastener 100 of FIG. 1 according to an example. The fastener 100 includes a fastener body 12 and a spool 14. The fastener body 12 has a mating member 16 at one end and a threaded member 18 at an opposite end. The mating member 16 extends from the fastener body 12. For example, the mating member 16 extends radially from the fastener body 12, such that the fastener body 12 lies on a first plane, $P_1$, and the mating member 16 lies on a second plane, $P_2$, perpendicular to the first plane, $P_1$.

The mating member 16 positions the fastener body 12 on a chassis. The mating member 16 includes a mating portion 20 that positions the mating member 16 on the chassis. The mating portion 20 mates with a positioning member on the chassis to prevent rotation of the fastener 100. For example, the mating member 16 includes a "D" shaped extender. The "D" shaped extender mates with a "D" shaped slot on the chassis. The "D" shaped slot includes a slot straight edge, such that in the locked position the mating straight edge of the "D" shaped extender aligns with the slot straight edge of the "D" shaped slot D" shaped to prevent rotation of the fastener about an axis, for example axis X in the first plane, $P_1$. In the example, the mating portion 20 is the mating straight edge that positions the fastener 100 in a locked position.

The fastener body 12 passes through a chassis and a sub-pan via, for example, a chassis aperture and a sub-pan aperture, such that the threaded member 18 extends through the chassis. The spool 14 engages with the threaded member 18 of the fastener body 12. The spool 14 and the fastener body 12 are secured to the chassis. A sub-pan holding the system board is attached to the chassis using the fastener 100. For example, the spool 14 may be a hex spool with a threaded receiver 24 that engages with the threaded member 18 of the fastener body 12.

Figure 3:
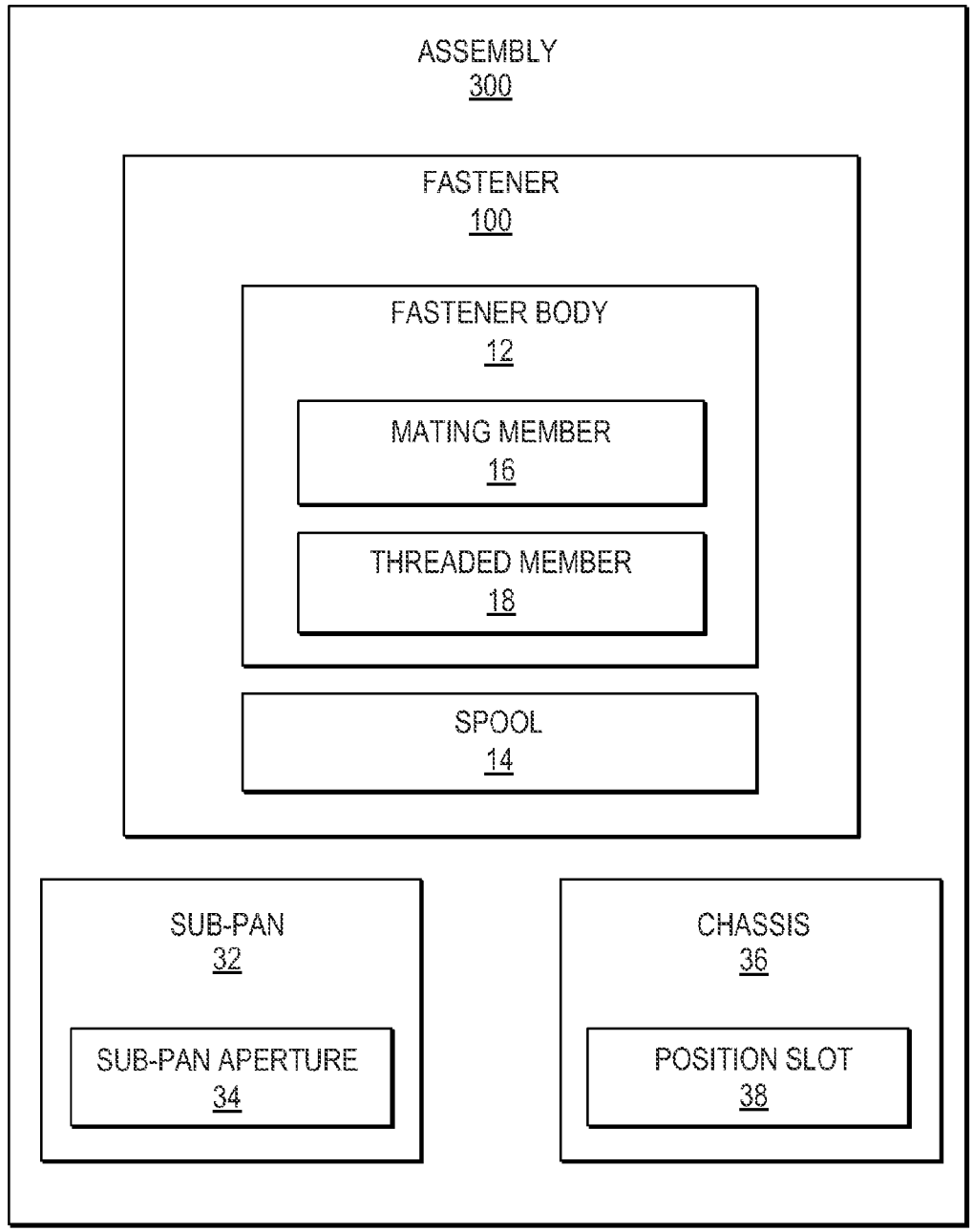
FIG. 3 illustrates a block diagram of an assembly according to an example.
Figure 4A:
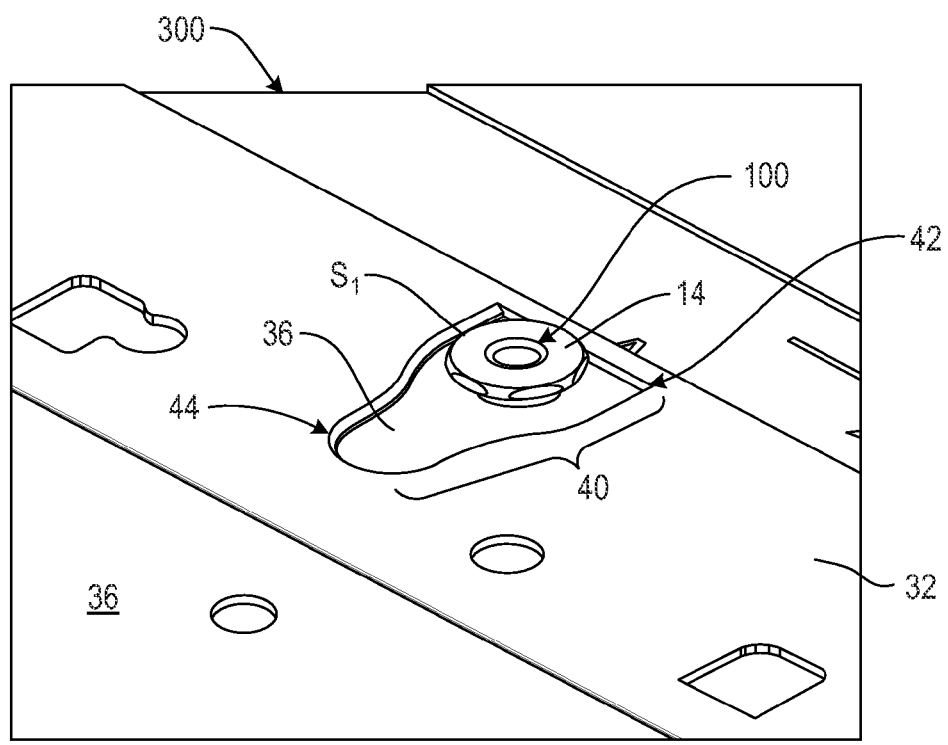
FIG. 4A illustrates a top view of the assembly of FIG. 3 according to an example.
Figure 4B:
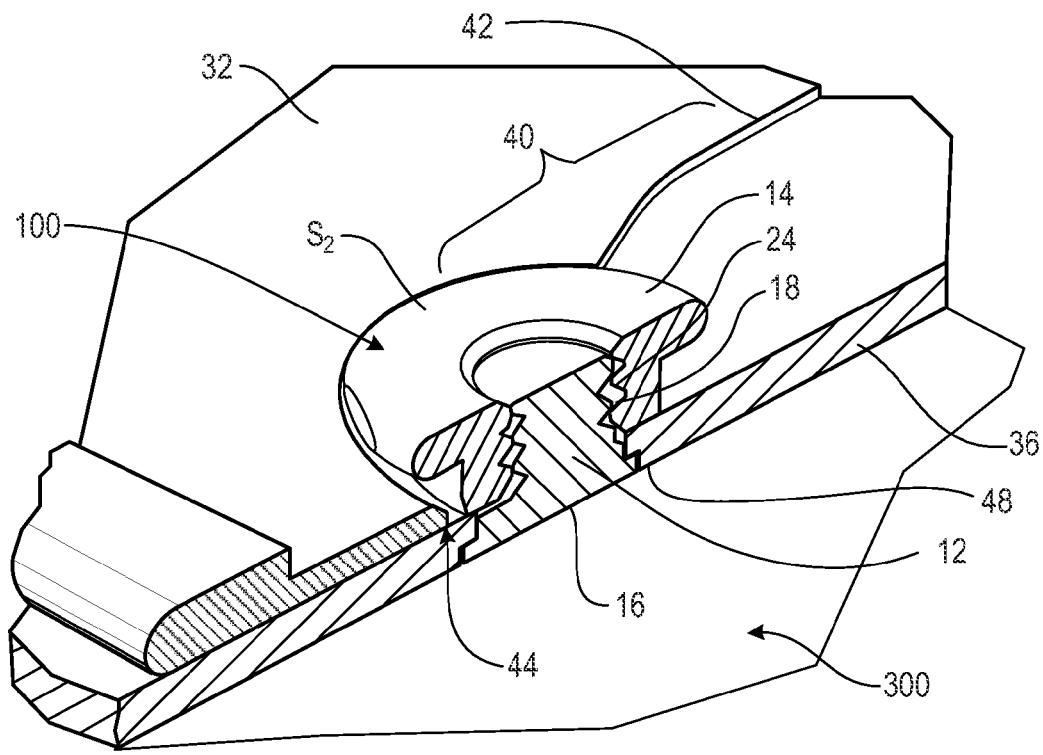
FIG. 4B illustrates a cross-sectional view of the assembly of FIG. 3 according to an example.
Figure 5:
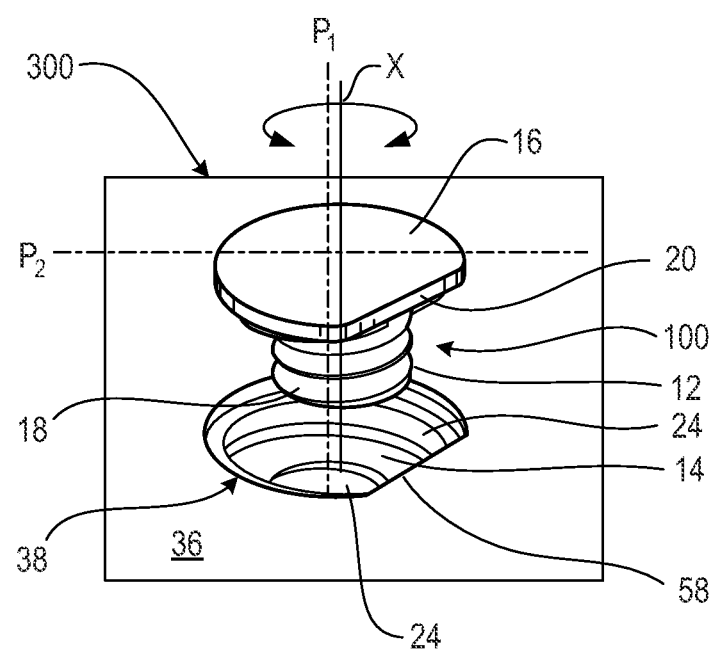
FIG. 5 illustrates a bottom view of the assembly of FIG. 3 according to an example.

FIG. 3 illustrates a block diagram of an assembly 300 according to an example. The assembly 300 is useable with a system board. The assembly includes a fastener 100, a sub-pan 32, and a chassis 36. FIG. 4A illustrates a top view of the assembly 300 of FIG. 3 according to an example. FIG. 4B illustrates a cross-sectional view of the assembly 300 of FIG. 3 according to an example. FIG. 5 illustrates a bottom view of the assembly 300 of FIG. 3 according to an example.

Referring to FIGS. 3-5, the fastener 100 includes a fastener body 12 and a spool 14. The fastener body 12 has a mating member 16 at one end and a threaded member 18 at an opposite end. The mating member 16 extends from the fastener body 12. For example, the mating member 16 extends radially from the fastener body 12, such that the fastener body 12 lies on a first plane, $P_1$, and the mating member 16 lies on a second plane, $P_2$, perpendicular to the first plane, $P_1$. The mating member 16 includes a mating portion 20 to position the mating member 16 in, for example, a locked position on a chassis 36.

The spool 14 engages with the threaded member 18 of the fastener body 12, such that the spool 14 and the fastener body 12 are secured together on the chassis 36 to receive the sub-pan 32 with the system board attached. The spool 14 is illustrated as a hex spool. The spool 14 includes a threaded receiver 24 that engages with the threaded member 18.

The chassis 36 receives the fastener 100 and the sub-pan 32. The chassis 36 includes a position slot 38 that receives the fastener body 12. The position slot 38 includes a chassis aperture 48 for the fastener body 12 to pass through the chassis 36 and a positioning member 58 to receive a mating portion 20 of the fastener body 12 and prevent rotation of the fastener 100. As illustrated in FIG. 5, the mating member 16 is a "D" shaped extender. The mating portion 20 includes a mating straight edge or the mating portion 20 to position the mating member 16 in a locked position. The position slot 38 comprises a "D" shaped slot to receive the "D" shaped mating member 16. The position slot 38 includes a slot straight edge or the positioning member 58, such that in the locked position, the mating straight is aligned with the slot straight edge to prevent rotation of the fastener 100 about an axis, X, on the first plane, $P_1$.

The sub-pan 32 receives the system board. The sub-pan 32 includes a sub-pan aperture 34 for the fastener body 12 to pass through the sub-pan 32. The sub-pan aperture 34 is illustrated in FIGS. 4A-4B as graduated 40, such that the sub-pan 32 is movable between an unengaged state, $S_1$, and an engaged state $S_2$. In the unengaged state, $S_1$, a first portion 42 of the sub-pan aperture 34 does not engage with the fastener 100. In the engaged state, $S_2$, a second portion 44 of the sub-pan aperture 34 engages with the fastener 100 to hold the sub-pan 32 and chassis 36 together.

Figure 6:
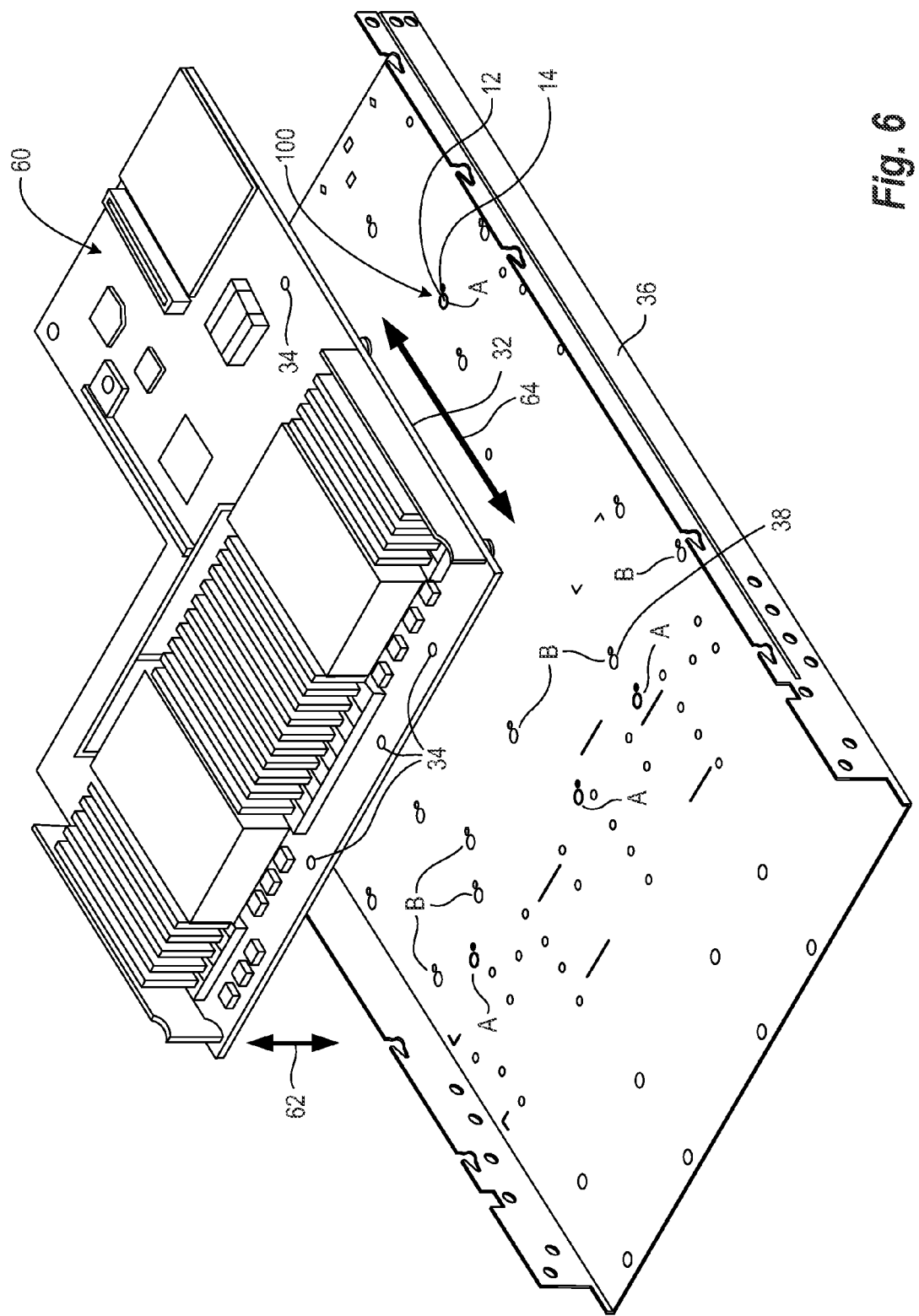
FIG. 6 illustrates a schematic view of the assembly of FIG. 3 according to an example.

FIG. 6 illustrates a schematic view of the assembly 300 of FIG. 3 according to an example. The assembly 300 includes the system board 60 attached to the sub-pan 32, the chassis 36, and the fastener 100. The chassis 36 includes a plurality of position slots 38 positioned on the chassis 36. The chassis 36 receives a plurality of fasteners 100 in a plurality of arrangements depending on the system board 60. The plurality of arrangements enable the same chassis 36 to accommodate a plurality of distinct system boards 60. For example, a chassis 36 may include, for example, twenty position slots 38 thereon. A first plurality of the position slots 38 labeled A may be an arrangement for a first system board 60 and sub-pan 32 assembly. A second plurality of position slots 38 labeled B may be an arrangement for a second and distinct system board 60 and sub-pan 32 assembly (not illustrated).

The plurality of fasteners 100 are attached to the chassis 36. The fasteners 100 are secured to the chassis 36. The fastener body 12 and the spool 14, when secured are fixed, such that the sub-pan 32 with the system board 60 attached may be placed onto the chassis 36 by aligning the sub-pan apertures 34 with the fasteners 100, e.g. the spool 14 engages with the fastener bodies 12 that are inserted into the position slot 38 on the chassis 36. Vertical arrow 62 illustrates positioning the sub-pan 32 on the chassis 36.

After the sub-pan 32 with the system board 60 is placed onto the chassis 36 in alignment with the fasteners 100, the sub-pan 32 engages with the chassis 36 and remains attached thereto when the sub-pan 32 is positioned between the spool 14 and the chassis 36. The fastener 100 holds the sub-pan 32 in place since the mating member 16 and/or mating portion 20 of the fastener body 12 prevent rotation of the fastener 100. The threaded member 18 of the fastener body 12 engages with the threated receiver 24 of the spool 14 to secure the fastener 100 on the chassis 36.

The sub-pan apertures 34 are slideably positioned into and out of engagement with the fastener 100, as illustrated by horizontal arrow 64. For example, the sub-pan aperture 34, as illustrated in FIG. 4A, is graduated to facilitate movement therein. The sub-pan 32 is movable between an unengaged state, $S_1$, and an engaged state, $S_2$. In the unengaged state, $S_1$, a first portion 42 of the sub-pan aperture 34 does not engage with the fastener 100, as illustrated in FIG. 4A. In the engaged state, $S_2$, a second portion 44 of the sub-pan aperture 34 engages with the fastener 100, as illustrated in FIG. 4B, to hold the sub-pan 32 and chassis 36 together.

Figure 7:
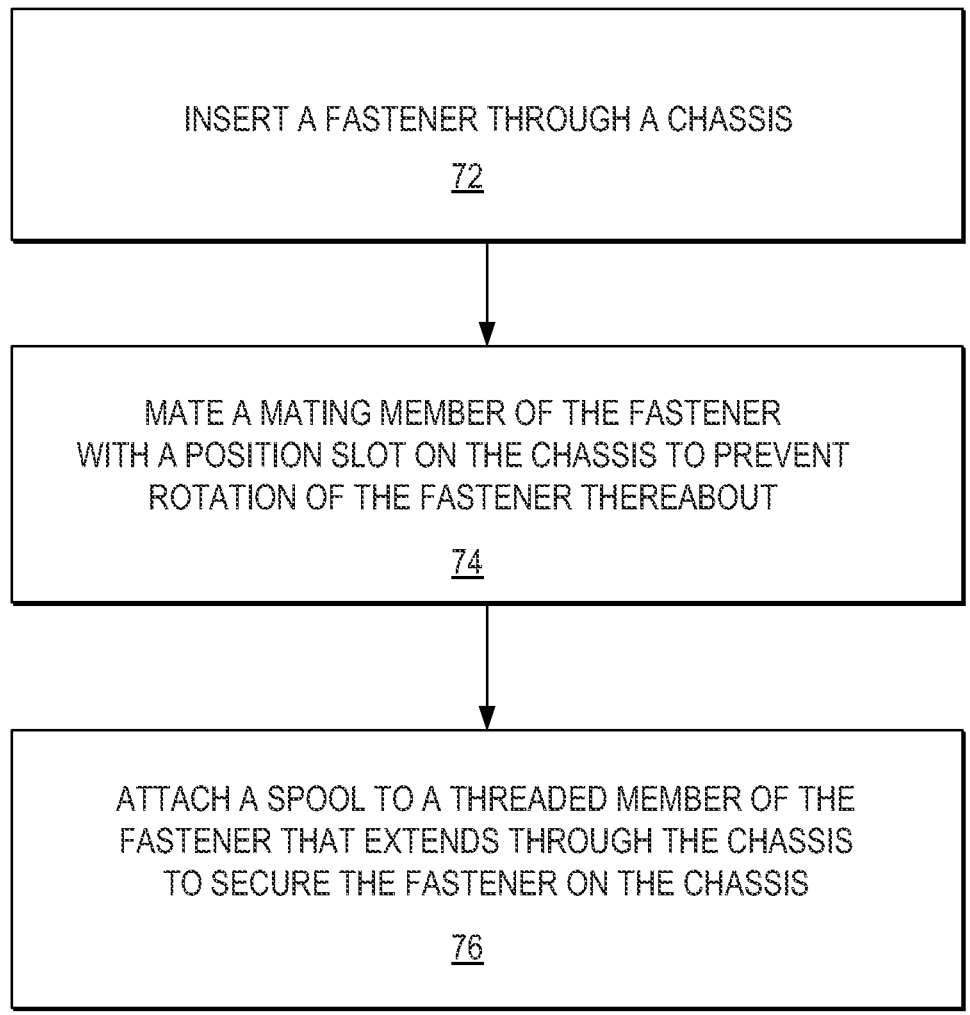
FIG. 7 illustrates a flow chart of a method to attach a system board to a chassis according to an example.

FIG. 7 illustrates a flow chart 700 of a method to attach a system board to a chassis according to an example. In block 72, a fastener is inserted through a chassis. The fastener includes a fastener body and a spool. The fastener body has a mating member at one end and a threaded member at an opposite end. The mating member is mated with a position slot on the chassis, in block 74. The engagement between the mating member and the position slot prevents rotation of the fastener thereabout. For example, the mating member includes a "D" shaped extender with a mating portion, i.e., a straight edge of the "D" shaped extender. The position slot includes a "D" shaped slot to receive the "D" shaped extender. The "D" shaped slot includes a positioning member, i.e., a straight edge of the "D" shaped slot. In a locked position, the straight edge of the "D" shaped extender and the "D" shaped slot are aligned to prevent rotation of the fastener.

In block 76, a spool is attached to the threaded member of the fastener body that extends through the chassis. The spool and the fastener body secure the fastener to the chassis such that the fastener is fixed. After the fastener is secured to the chassis, the sub-pan with the system board attached is positioned onto the chassis between the spool and the chassis.

The method enables the sub-pan aperture to be slid into and out of engagement with the fastener. For example, the sub-pan aperture is graduated to facilitate movement therein. The sub-pan is movable between an unengaged state and an engaged state. In the unengaged state, a first portion of the sub-pan aperture does not engage with the fastener. In the engaged state a second portion of the sub-pan aperture engages with the fastener to hold the sub-pan and chassis together. The engagement includes the sub-pan positioned between the spool and the chassis, such that the spool and chassis hold or keep the sub-pan attached thereto.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A fastener useable with a system board, the fastener comprising:
    a fastener body with a mating member at one end and a threaded member at an opposite end, the mating member extending from the fastener body, the mating member to position the fastener body on a chassis, and the mating member comprising a "D" shaped extender that mates with a "D" shaped slot on the chassis; the fastener body to pass through a chassis aperture, wherein the chassis aperture passes through the chassis uninhibited, such that the threaded member extends therethrough;

a spool to engage with the threaded member of the fastener body, such that the spool and the fastener body are secured to the chassis to receive a sub-pan, wherein the sub-pan is located on a top surface of the chassis, and wherein a bottom surface of the chassis extends substantially beyond a length of the sub-pan, and wherein the system board is located on a top surface of the sub-pan.

2. The fastener of claim 1, further comprising a mating portion to mate with a positioning member on the chassis and to prevent rotation of the fastener.

3. The fastener of claim 1, wherein the spool comprises a hex spool.

4. The fastener of claim 1, wherein the spool further comprises a threaded receiver to engage with the threaded member.

5. The fastener of claim 1, wherein the mating member extends radially from the fastener body, such that the fastener body lies on a first plane and the mating member lies on a second plane perpendicular to the first plane.

6. The fastener of claim 1, wherein the mating member further comprises a mating portion to position the mating member such that the fastener body does not rotate.

7. The fastener of claim 1, wherein the "D" shaped extender comprises a mating straight edge to position the mating member in a locked position.

8. The fastener of claim 7, wherein the "D" shaped slot comprises a slot straight edge, such that in the locked position the mating straight edge of the "D" shaped extender aligns with the slot straight edge of the "D" shaped slot D" shaped to prevent rotation of the fastener.

9. An assembly useable with a system board, the system comprising:
a fastener comprising a fastener body and a spool,
the fastener body with a mating member at one end and a threaded member at an opposite end, the mating member extending from the fastener body, the mating member comprises a "D" shaped extender with a mating portion to position the mating member on a chassis, the chassis comprising a "D" shaped slot to receive the "D" shaped extender;
the spool to engage with the threaded member of the fastener body, such that the spool and the fastener body are secured directly together;
the chassis to receive the fastener and a sub-pan, the chassis comprising a position slot to receive the fastener body, the position slot comprising a chassis aperture for the fastener body to pass through, wherein the chassis aperture passes through the chassis uninhibited, and a positioning member to receive the mating portion of the fastener body and prevent rotation of the fastener; and
the sub-pan to receive the system board, wherein the sub-pan is located on a top surface of the chassis, wherein a bottom surface of the chassis extends substantially beyond a length of the sub-pan, wherein the system board is located on a top surface of the sub-pan, and the sub-pan comprising a sub-pan aperture to engage with the spool and the chassis.

10. The assembly of claim 9, wherein the spool further comprises a threaded receiver to engage with the threaded member.

11. The assembly of claim 9, wherein the mating member extends radially from the fastener body, such that the fastener body lies on a first plane and the mating member lies on a second plane perpendicular to the first plane.

12. The assembly of claim 9, wherein the position slot comprises a plurality of position slots positioned on the chassis, such that the chassis receives a plurality of fasteners in a plurality of arrangements depending on the system board.

13. The assembly of claim 9, wherein the mating portion comprises a mating straight edge to position the mating member in a locked position.

14. The assembly of claim 13, wherein the "D" shaped slot comprises a slot straight edge such that in the locked position the mating straight edge of the "D" shaped extender and the slot straight edge of the "D" shaped slot are aligned to prevent rotation of the fastener.

15. The assembly of claim 9, wherein the sub-pan aperture is graduated such that the sub-pan is movable between an unengaged state and an engaged state, in the unengaged state a first portion of the sub-pan aperture does not engage with the fastener, in the engaged state a second portion of the sub-pan aperture engages with the fastener to hold the sub-pan and chassis together.

16. The assembly of claim 15, wherein the sub-pan aperture slides into and out of engagement with the fastener.

17. A method to attach a system board to a chassis, the method comprising:
inserting a fastener through the chassis, the fastener comprises a fastener body with a mating member at one end and a threaded member at an opposite end, wherein the mating member comprises a "D" shaped extender, and wherein a chassis aperture passes through the chassis uninhibited to receive the fastener;
mating the "D" shaped extender with a "D" shaped slot on the chassis, such that engagement between the "D" shaped extender and the "D" shaped slot prevents rotation of the fastener thereabout;
attaching a spool to the threaded member of the fastener body that extends through the chassis to secure the fastener to the chassis; and
sliding a sub-pan into and out of engagement with the fastener, wherein the sub-pan is to be located on a top surface of the chassis, wherein a bottom surface of the chassis extends substantially beyond a length of the sub-pan, and wherein the system board is located on a top surface of the sub-pan.

18. The method of claim 17, wherein the sub-pan is movable between an unengaged state and an engaged state, in the unengaged state a first portion of a sub-pan aperture does not engage with the fastener, in the engaged state a second portion of the sub-pan aperture engages with the fastener to hold the sub-pan and the chassis together, the sub-pan aperture is graduated to facilitate movement therebetween.

19. The method of claim 17, further comprising:
securing the fastener to the chassis, such that the fastener is fixed, and
positioning the sub-pan with the system board attached between the spool and the chassis.

* * * * *